United States Patent [19]
Rallison

[11] Patent Number: 5,642,227
[45] Date of Patent: Jun. 24, 1997

[54] OPTICAL CORRECTION FOR VIRTUAL REALITY AND HEADS UP DISPLAYS

[75] Inventor: Richard Dennis Rallison, Paradise, Utah

[73] Assignee: Virtual I/O, Inc., Seattle, Wash.

[21] Appl. No.: 468,050

[22] Filed: Jun. 6, 1995

Related U.S. Application Data

[63] Continuation of Ser. No. 436,494, May 8, 1995, which is a continuation of Ser. No. 152,213, Nov. 12, 1993, abandoned, which is a division of Ser. No. 832,237, Feb. 7, 1992, Pat. No. 5,303,085.

[51] Int. Cl.$^6$ .................................................. G02B 27/14
[52] U.S. Cl. ........................... 359/631; 359/630; 359/633
[58] Field of Search .................................. 359/630, 631, 359/629, 633; 348/359; 358/484

[56] References Cited

U.S. PATENT DOCUMENTS

| | | | |
|---|---|---|---|
| D. 300,476 | 3/1989 | Sestak | D29/18 |
| D. 301,644 | 6/1989 | Sestak | D29/18 |
| D. 334,557 | 4/1993 | Hunter et al. | D14/114 |
| D. 334,742 | 4/1993 | Hunter et al. | D14/113 |
| D. 337,320 | 7/1993 | Hunter et al. | D14/113 |
| D. 338,514 | 8/1993 | Holmes | D21/240 |
| 2,955,156 | 10/1960 | Heilig | 178/6.5 |
| 2,958,258 | 11/1960 | Kelly | 88/24 |
| 3,043,910 | 7/1962 | Hicks | 178/7.85 |
| 3,589,795 | 6/1971 | Miyazaki et al. | 350/96 B |
| 3,614,314 | 10/1971 | Rossire | 178/7.88 |
| 3,874,783 | 4/1975 | Cole | 350/96 B |

(List continued on next page.)

FOREIGN PATENT DOCUMENTS

| | | | |
|---|---|---|---|
| 91309108 | 10/1991 | European Pat. Off. | |
| 2517916 | 6/1983 | France | H04N 9/54 |

(List continued on next page.)

OTHER PUBLICATIONS

Assenheim et al., "Large–Screen–Projection, Avionic, and Helmet–Mounted Displays", Proceedings, The International Society for Optical Engineering, Feb. 26–28, 1991, vol. 1456, pp. 179–190.

(List continued on next page.)

*Primary Examiner*—Georgia Y. Epps
*Assistant Examiner*—Ricky Mack
*Attorney, Agent, or Firm*—Bogle & Gates P.L.L.C.

[57] ABSTRACT

The present invention eliminates the relay lens systems found in conventional helmet mounted displays (HMDs) by removing field distortions and aberrations with a contoured fiber optic faceplate placed in close proximity to a liquid crystal display (LCD) or cathode ray tube. The optical system typically consists of a spherical dielectric or holographically made collimator - combiner, a dielectric or holographically made fold mirror, and a contoured fiber optic faceplate. The fold mirror is flat, and the collimator - combiner is made by coating a spherical eye glass blank. The system is configured as a folded and tilted catadioptric projector with the novel feature being the contoured faceplate. There are no dispersive elements in the imaging assembly which means it can be completely polychromatic (full color) without the need for additional color correction optics as found in all refractive color systems. When designed for full color, highest brightness, and see through capability it must be made with two or three narrow spectral and angular sensitive coatings on the fold mirror and on the collimator - combiner. These coatings allow the use of a tilt of the collimator - combiner with respect to the fold mirror which induces a small amount of astigmatism and keystone distortion but at the same time allows image light to pass through the folded optics to the eye with a minimum of loss. The elimination of a corrective refractive lens relay system makes this design polychromatic, less expensive, and lighter in weight, compared to a similar system with an achromatized and corrected refractive lens.

10 Claims, 2 Drawing Sheets

U.S. PATENT DOCUMENTS

| | | | |
|---|---|---|---|
| 3,915,548 | 10/1975 | Opittek et al. | 350/3.5 |
| 3,923,370 | 12/1975 | Mostrom | 350/55 |
| 3,940,204 | 2/1976 | Withrington | 350/3.5 |
| 3,945,721 | 3/1976 | Corcoran | 353/84 |
| 4,026,641 | 5/1977 | Bosserman et al. | 350/298 |
| 4,028,725 | 6/1977 | Lewis | 358/103 |
| 4,042,957 | 8/1977 | Ellis | 358/109 |
| 4,048,653 | 9/1977 | Spooner | 358/104 |
| 4,257,062 | 3/1981 | Meredith | 358/81 |
| 4,269,476 | 5/1981 | Gauthier et al. | 350/174 |
| 4,310,849 | 1/1982 | Glass | 358/88 |
| 4,322,135 | 3/1982 | Freeman | 350/410 |
| 4,348,185 | 9/1982 | Breglia et al. | 434/43 |
| 4,361,384 | 11/1982 | Bosserman | 350/174 |
| 4,385,803 | 5/1983 | Ellis | 350/174 |
| 4,395,731 | 7/1983 | Schoolman | 358/88 |
| 4,398,799 | 8/1983 | Swift | 350/174 |
| 4,437,113 | 3/1984 | Lee et al. | 358/93 |
| 4,439,157 | 3/1984 | Breglia et al. | 434/40 |
| 4,446,480 | 5/1984 | Breglia et al. | 358/104 |
| 4,465,347 | 8/1984 | Task et al. | 350/538 |
| 4,468,101 | 8/1984 | Ellis | 350/538 |
| 4,550,984 | 11/1985 | Reymond | 350/404 |
| 4,559,555 | 12/1985 | Schoolman | 358/88 |
| 4,561,723 | 12/1985 | Hamano et al. | 350/331 R |
| 4,571,628 | 2/1986 | Thornton | 358/224 |
| 4,636,866 | 1/1987 | Hattori | 358/236 |
| 4,641,931 | 2/1987 | Loy | 350/538 |
| 4,651,201 | 3/1987 | Schoolman | 358/98 |
| 4,652,870 | 3/1987 | Steward | 340/705 |
| 4,695,129 | 9/1987 | Faessen et al. | 350/96.25 |
| 4,706,117 | 11/1987 | Schoolman | 358/88 |
| 4,711,512 | 12/1987 | Upatnieks | 350/3.7 |
| 4,737,972 | 4/1988 | Schoolman | 378/41 |
| 4,743,200 | 5/1988 | Welch et al. | 434/43 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,763,990 | 8/1988 | Wood | 350/320 |
| 4,775,217 | 10/1988 | Ellis | 350/538 |
| 4,786,966 | 11/1988 | Hanson et al. | 358/108 |
| 4,791,300 | 12/1988 | Yin | 250/363 R |
| 4,796,987 | 1/1989 | Linden | 351/158 |
| 4,797,736 | 1/1989 | Kloots et al. | 358/93 |
| 4,799,765 | 1/1989 | Ferrer | 350/174 |
| 4,805,988 | 2/1989 | Dones | 350/137 |
| 4,806,011 | 2/1989 | Bettinger | 351/158 |
| 4,807,202 | 2/1989 | Cherri et al. | 367/129 |
| 4,821,727 | 4/1989 | Levene | 128/653 |
| 4,826,287 | 5/1989 | Cook et al. | 350/174 |
| 4,853,764 | 8/1989 | Sutter | 358/3 |
| 4,859,030 | 8/1989 | Rotier | 350/174 |
| 4,859,031 | 8/1989 | Berman et al. | 350/174 |
| 4,867,551 | 9/1989 | Perera | 351/158 |
| 4,869,575 | 9/1989 | Kubik | 350/174 |
| 4,871,228 | 10/1989 | Roos | 385/116 |
| 4,874,214 | 10/1989 | Cheyason et al. | 350/3.7 |
| 4,874,235 | 10/1989 | Webster | 351/201 |
| 4,884,137 | 11/1989 | Hanson et al. | 358/108 |
| 4,884,219 | 11/1989 | Waldren | 364/514 |
| 4,897,715 | 1/1990 | Beamon | 358/93 |
| 4,900,133 | 2/1990 | Berman | 350/346 |
| 4,902,083 | 2/1990 | Wells | 350/6.6 |
| 4,902,116 | 2/1990 | Ellis | 350/501 |
| 4,902,120 | 2/1990 | Weyer | 351/158 |
| 4,904,049 | 2/1990 | Hegg | 350/96.27 |
| 4,930,888 | 6/1990 | Freisleben et al. | 356/152 |
| 4,932,731 | 6/1990 | Suzuki et al. | 350/3.7 |
| 4,933,755 | 6/1990 | Dahl et al. | 358/88 |
| 4,934,773 | 6/1990 | Becker | 350/6.6 |
| 4,952,024 | 8/1990 | Gale | 350/143 |
| 4,961,625 | 10/1990 | Wood et al. | 350/174 |
| 4,961,626 | 10/1990 | Fournier et al. | 350/174 |
| 4,968,123 | 11/1990 | Fournier et al. | 350/538 |
| 4,969,714 | 11/1990 | Fournier et al. | 353/174 |
| 4,969,724 | 11/1990 | Ellis | 350/503 |
| 4,970,589 | 11/1990 | Hanson et al. | 358/108 |
| 4,982,278 | 1/1991 | Dahl et al. | 358/88 |
| 4,983,014 | 1/1991 | Nattermann | 350/96.24 |
| 4,984,179 | 1/1991 | Waldern | 364/514 |
| 4,993,790 | 2/1991 | Vick | 350/3.73 |
| 4,995,165 | 2/1991 | Daniels | 33/361 |
| 5,003,300 | 3/1991 | Wells | 340/705 |
| 5,005,213 | 4/1991 | Hanson et al. | 455/617 |
| 5,019,828 | 5/1991 | Schoolman | 342/457 |
| 5,034,809 | 7/1991 | Katoh | 358/88 |
| 5,035,473 | 7/1991 | Kuwayama et al. | 350/3.7 |
| 5,039,198 | 8/1991 | VanBeek | 385/117 |
| 5,046,827 | 9/1991 | Frost et al. | 359/54 |
| 5,050,966 | 9/1991 | Berman | 359/38 |
| 5,053,755 | 10/1991 | Smith | 340/705 |
| 5,081,542 | 1/1992 | Efron et al. | 359/41 |
| 5,089,903 | 2/1992 | Kuwayama et al. | 359/15 |
| 5,091,719 | 2/1992 | Beamon | 340/705 |
| 5,123,726 | 6/1992 | Webster | 351/201 |
| 5,124,821 | 6/1992 | Antier et al. | 359/14 |
| 5,129,716 | 7/1992 | Holakovszky et al. | 351/50 |
| 5,130,794 | 7/1992 | Ritchey | 358/87 |
| 5,138,555 | 8/1992 | Albrecht | 364/424.06 |
| 5,151,722 | 9/1992 | Massof et al. | 351/158 |
| 5,162,828 | 11/1992 | Furness et al. | 353/122 |
| 5,162,928 | 11/1992 | Taniguchi et al. | 359/13 |
| 5,164,848 | 11/1992 | Firth et al. | 359/13 |
| 5,166,778 | 11/1992 | Beamon | 358/3 |
| 5,170,153 | 12/1992 | Migozzi et al. | 340/705 |
| 5,181,013 | 1/1993 | Bagshaw | 340/702 |
| 5,184,231 | 2/1993 | Ellis | 359/13 |
| 5,189,512 | 2/1993 | Cameron et al. | 358/93 |
| 5,192,960 | 3/1993 | Komamura | 351/41 |
| 5,198,928 | 3/1993 | Chauvin | 359/465 |
| 5,200,844 | 4/1993 | Suvada | 359/40 |
| 5,231,379 | 7/1993 | Wood et al. | 340/705 |
| 5,255,211 | 10/1993 | Redmond | 364/578 |
| 5,274,405 | 12/1993 | Webster | 351/158 |
| 5,276,471 | 1/1994 | Yamauchi et al. | 351/153 |
| 5,278,680 | 1/1994 | Karasawa et al. | 359/40 |
| 5,281,957 | 1/1994 | Schoolman | 345/8 |
| 5,293,271 | 3/1994 | Merritt et al. | 359/858 |
| 5,300,942 | 4/1994 | Dolgoff | 345/32 |
| 5,303,085 | 4/1994 | Rallison | 359/631 |
| 5,305,244 | 4/1994 | Newman et al. | 364/708.1 |
| 5,309,169 | 5/1994 | Lippert | 345/8 |
| 5,320,538 | 6/1994 | Baum | 434/307 |
| 5,321,416 | 6/1994 | Bassett et al. | 345/8 |
| 5,322,441 | 6/1994 | Lewis et al. | 434/307 |
| 5,323,174 | 6/1994 | Klapman et al. | 345/156 |
| 5,327,175 | 7/1994 | Kim | 348/526 |
| 5,331,149 | 7/1994 | Spitzer et al. | 250/221 |
| 5,334,991 | 8/1994 | Wells et al. | 345/8 |
| 5,335,299 | 8/1994 | Atkinson | 382/56 |
| 5,347,400 | 9/1994 | Hunter | 359/815 |
| 5,353,042 | 10/1994 | Klapman et al. | 345/156 |
| 5,357,372 | 10/1994 | Chen et al. | 359/637 |
| 5,383,053 | 1/1995 | Hegg et al. | 359/486 |
| 5,392,158 | 2/1995 | Tosaki | 359/633 |
| 5,408,346 | 4/1995 | Trissel et al. | 359/65 |
| 5,451,976 | 9/1995 | Ito | 345/8 |

FOREIGN PATENT DOCUMENTS

| | | | |
|---|---|---|---|
| 3532730 | 3/1987 | Germany | A61B 1/04 |
| 3628458 | 2/1988 | Germany | H04N 1/20 |
| 4225589A1 | 2/1994 | Germany | G09F 9/00 |

| | | | |
|---|---|---|---|
| 59-117889 | 7/1984 | Japan | H04N 9/54 |
| 59-219092 | 12/1984 | Japan | H04N 9/54 |
| 62-272698 | 11/1987 | Japan . | |
| 63-82192 | 4/1988 | Japan . | |
| 63-177689 | 7/1988 | Japan . | |
| 1-61723 | 3/1989 | Japan . | |
| 5-46161 | 2/1993 | Japan | G09G 5/36 |
| 6-59217 | 3/1994 | Japan | G02B 27/28 |
| 2266385 | 10/1993 | United Kingdom | G02B 23/10 |
| 2270775 | 3/1994 | United Kingdom | G02B 27/02 |
| 2274727 | 8/1994 | United Kingdom | G02B 27/00 |
| 2279201 | 12/1994 | United Kingdom | H04R 1/10 |
| 2281846 | 3/1995 | United Kingdom | A45F 3/00 |
| 2287551 | 9/1995 | United Kingdom | G02B 23/00 |
| 84/01680 | 4/1984 | WIPO | H04N 5/64 |
| WO92/03756 | 3/1992 | WIPO | G02B 27/00 |
| 93/23783 | 11/1993 | WIPO | G02B 27/00 |
| WO94/11855 | 5/1994 | WIPO | G09G 3/02 |
| WO94/14152 | 6/1994 | WIPO | G09G 3/02 |
| WO94/24658 | 10/1994 | WIPO | G09G 3/02 |
| WO95/10106 | 4/1995 | WIPO | G09G 3/02 |
| WO95/10061 | 4/1995 | WIPO | G02B 26/10 |

OTHER PUBLICATIONS

Benton, "Practical Holography VIII", Proceedings, The International Society for Optical Engineering, Feb. 7–9, 1994, vol. 2176, pp. 241–248.

Driscoll et al., *Handbook of Optics*, McGraw–Hill Book Company, 1978, pp. 13–16.

Fischer, "Fundamentals and Optics for Head Mounted Displays," Photonics West '95, Feb. 4–10, 1995.

Rotier, "Optical Approaches to the Helmet Mounted Display", *SPIE*, 1989, vol. 1116, pp. 14–17.

Sony, "Visortron" advertisement.

"Survey of Head Mounted Displays", *Real Time Graphics*, Aug. 1994, vol. 3, No. 2, pp. 1, 8–12.

Virtual I/O, Inc., "PDS Gamer™", advertisement.

*VR News*, Dec. 1994, vol. 3, Issue 10, pp. 4, 8, 12.

"Airlines Weigh Benefits, Costs of At–Seat Video", *Aviation Week & Space Technology*, Aug. 15, 1994, pp. 44–45.

Pope, "Say ahhh! Videos help you relax", *The Times–Picayune*, Oct. 25, 1994, pp. 1, A–6.

Farmer, "The right solution to the right problem . . . now", *Comdex Daily*, Nov. 15, 1994, p. 4.

Siggraph, *Nikkei Electronics*, Aug. 22, 1994, pp. 13–14.

Virtual I/O, "i–glasses!", *Twice CES Daily*, Jan. 6, 1995, p. 30.

Virtual I/O, Specifications, *Virtual Reality World*, Nov./Dec. 1994, p. 11.

Virtual I/O, *VR News*, Aug./Sep. 1994, p. 17.

Antonoff, "Real estate is cheap here, but the places you'd most want to visit are still under construction", *Popular Science*, Jun. 1993, pp. 83–86, 124–125.

Burley, et al., "A full–color wide–field–of–view holographic helmet–mounted display for pilot/vehicle interface development and human factors studies", *SPIE*, vol. 1290 Helmet–Mounted Displays II (1990), pp. 9–15.

Carr, "Is Virtual Reality Virtually Here?", *Training & Development*, Oct. 1992, pp. 37–41.

Fisher et al., "Living in a Virtual World", *BYTE*, Jul. 1990, pp. 215–221.

Horn, "Seeing the invisible", *U.S. News & World Report*, Jan. 28, 1991.

James, "Goggles Brighten Dark Subway", *The New York Times*, Apr. 10, 1992.

Jones et al., "Evaluation of conformal and body–axis attitude information for spatial awareness", *SPIE*, vol. 1695 Helmet–Mounted Displays III (1992), pp. 146–153.

Starks, "Stereoscopic video and the quest for virtual reality: an annotated bibliography of selected topics", *SPIE*, vol. 1457 Stereoscopic Displays and Applications II (1991), pp. 327–343.

Stewart, "Through the looking glass into an artificial world—via computer", *Smithsonian*, vol. 21, No. 10, Jan. 1991, pp. 36–45.

Foley, "Interfaces for Advanced Computing", *Scientific American*, Oct. 1987, vol. 257, No. 4, pp. 126–135.

Krueger, *Artificial Reality II*, 1991 Addison–Wesley Publishing Company, Inc., pp. 66–82, 102–116, 130–149, 179–182, 237–239, 267–279.

Sutherland, "A head–mounted three dimensional display", Fall Joint Computer Conference, 1968, pp. 757–763.

OPTICAL CORRECTION FOR VIRTUAL REALITY AND HEADS UP DISPLAYS

CROSS-REFERENCE TO RELATED APPLICATION

This is a continuation of Ser. No. 08/436,494, filed May 8, 1995, which is a continuation of Ser. No. 08/152,213, filed Nov. 12, 1993, now abandoned, which is a Division of application Ser. No. 07/832,237, filed Feb. 7, 1992, now U.S. Pat. No. 5,303,085 for which a Notice of Allowance has been issued.

GOVERNMENT LICENSE RIGHTS

The U.S. Government has a paid-up license in this invention and the right in limited circumstances to require the patent owner to license others on reasonable terms as provided by the terms of contract No. DAAA15-92-C-0055 awarded by the Department of the Army.

BACKGROUND OF THE INVENTION

1. Field of the Invention

This invention relates to helmet mounted displays that generate images which constitute all that the observer sees or which are combined with the observer's normal view of the surrounding environment.

DESCRIPTION OF THE RELATED ART

Helmet mounted stereo displays have been around at least since McCullum described a wireless system using two cathode ray tubes (CRTs) in 1943 (U.S. Pat. No. 2,388,170). They have been used in avionics, tanks, as sights for soldiers and helicopter pilots, in surgery, at workstations, for robotics and in entertainment devices.

U.S. Pat. Nos. 4,982,278, 4,884,137, 4,970,589, 4,874,214, 4,761,056, 4,398,799, 4,465,347, 3,614,314, 305,919, 2,955,156, 4,859,030, 4,269,476, 4,322,135, 4,761,056, 4,969,724, 4,902,116, 4,468,101, 4,775,217, 4,968,123, 4,961,626, 4,969,714, 4,897,715, 4,028,725, 4,571,628, 4,982,278, 4,933,755, 4,952,024, 4,805,988, 4,385,803, 4,853,764 and 4,874,235 all have some elements of their design in common with the present invention. Most of these designs have complex refractive optical trains to relay the image from a CRT or liquid crystal display (LCD) to the eye. They typically utilize a combination of lenses, mirrors, and holographic optics; a few include fiber optics in some form. Some are monochromatic and some are polychromatic; some, binocular; and a few are biocular (both eyes see the same image).

Foreign patents that are related include German nos. 3532730, 3628458, 224691, and 3532730; French no. 2517916; and Japanese no. 63-82192, 63-177689, 59-117889, 59-219092, 62-272698, and 1-61723WO 84/01680. Most of these are heads up displays (HUD) where the projected image is made to overlay a see through view of the real world, but some are for non-see through wide angle virtual reality projection such as the contoured fiber optic design of Webster, U.S. Pat. No. 4,874,235. In Webster's design two contoured fiber optic bundles are made concave to extend the field of view (FOV) and also greatly distort the input image which is viewed with strong contact lenses, and no see through light is allowed. A coherent image conduit of fibers is in effect an image relay system that can also change the size and shape of an image to control the field of view or concentrate the image light from a large display via a tapered section of fibers. It is also a well known practice to use flexible coherent bundles as image conduit over a meter or more and, furthermore, to divide the bundle into smaller bundles with tapers attached to increase the total number of pixels displayed (SBWP) by combining multiple remote inputs to make one high-resolution output. This practice is not a part of the present invention, and it is extremely expensive to implement.

The popular LEEP lens design of Teitel U.S. Pat. No. 4,982,278, could also not be made to work in a see through configuration because the eye relief (the distance between the eye and the first optical element) is too short to insert a folding optic of any sort, which is necessary for most wide FOV see through or heads up display (HUD) designs.

In the present invention, holographic optical elements (HOEs) have been used to make the fold mirror and the collimator-combiner. Because of this it is useful to know a little about the history of HOEs in spite of the fact that they are not necessary to the workings of this invention, as they may be replaced by conventional dielectric mirrors made commercially in a vacuum chamber.

Historically HOEs have been used as combiners and or collimators in helmet mounted displays (HMDs) at least since Don Close and Andrejs Graube of Hughes aircraft company (Air Force contract no. F33615-73-C-4110), and others at Hughes Aircraft put them on visors in the early 1970s. One fabrication method practiced then was film transfer, a process whereby the hologram was formed in gelatin and processed on a stable flat glass substrate and subsequently loosened, lifted off, and transferred to the cylindrical plastic visor where it was then laminated with a matching visor. The method required considerable skill and patience and some unusual exposure optics to compensate for the cylindrical surface.

An alternative to their method involves subbing (preparing the surface for an aqueous solution) the spherical or cylindrical plastic so that it will take a sensitized gelatin coating and then holding the coated plastic rigidly to obtain the required stability for a two beam exposure to laser light. This method requires developing ways to sub and coat with good optical quality but results in well-corrected optics with relatively low dispersion and flare light compared to flat plates. This method probably has the greatest potential for perfect imaging over the largest field of view but will always leave some flare light from fringes at the substrate and cover interface and, if made for more than one color, will have considerable chromatic aberration. It is the basis of U.S. Pat. No. 4,874,214 belonging to Thompson CSF of France. The present invention will not have any flare light nor any chromatic aberration because, unlike the prior art, the reflection hologram is made to conform to the shape of the plastic sustrate, which is spherical.

When flare light is not a problem for the user and optical bandwidths on playback are less than 15 nm then the HOE on a flat glass or plastic substrate may be used with good imaging quality over a field of view (FOV) of about 20 degrees. These elements have been made with good success by using aspheric optics, decentered or tilted optics and/or computer generated diffractive optics (CGH) to generate the optimum interfering wavefronts. More recently they have been made using simple spherical waves to form intermediate HOEs that will generate the optimum corrected wavefronts when reconstructed in a different geometry or at a different wavelength from the one in which they were originally constructed. This recent method, called a recursive design technique, was developed by Amitai and Friesem and is relatively easy to implement. Variations of this approach were introduced earlier by Ono in the design of holographic scanners, collimators and transform optics and were applied to a biocular HUD design for the U.S. Air Force (contract F33615-86-C-3618) by Richard D. Rallison in 1986. The major advantage with this method is the ease of manufacturing on flat plates. The disadvantages are the limited field of view and the necessity of using only one wavelength with a narrow spectral bandwidth, typically about 15 nanometers. The present invention has no such restrictions on either bandwidth or FOV.

A popular design in recent years is the result of the requirement to make FOVs increasingly larger and to make scenes more natural in color or simply more colorful for better or faster interpretation of displayed information. This design goal may be met by employing an element referred to as a spherical conformal holographic reflector, which has no dispersive qualities and a controllable spectral bandwidth. It has been made and used by many investigators for HUDs or HMDs, including Wood, Margarinos, Tedesco and others, mainly for aircraft and eye protection and is in some ways the simplest holographic element to produce. Fabrication requires the coating of spherical glass or plastic substrates, such as an ophthalmic lens blank, with a holographic quality film but requires only a single beam of low coherence to expose. The object wave is derived from a portion of the reference wave reaching the conformal mercury or simply the film-air interface. This is the preferred method of making a collimator-combiner for the present invention or, if a virtual reality display (VRD) is being made, then the same blank may be coated with aluminum in a vacuum chamber.

A similar technology is used on the ophthalmic (lens blank) substrates popular in several folded catadioptric (CAT) HMD designs. At Honeywell the substrates have been coated by vapor deposition of dielectrics in a vacuum. In addition to folding the optical path, some of their designs have a tilt angle other than 45 degrees between the fold mirror and the collimator to improve image light efficiency. As long as the tilt angle in these systems can remain small, simple inexpensive spherical optics can be used even for a FOV of 50 degrees. Typical tilt, or off-axis angles, range from 6 to 12 degrees with cost and complexity of associated corrective refractive optics going up geometrically as the angle increases. Designs with zero tilt angle do not let the image light that was folded onto the collimator pass through the fold mirror to the eye without a loss in intensity. Much of the collimated light impinges on the fold mirror at about the same angle that it was originally folded toward the collimator, which causes it to be reflected back to the image source, rather than pass through to the eye. The introduction of the tilt allows the light from the collimator to impinge on the fold mirror at an angle at which it does not reflect efficiently. This tilt generates aberrations that are difficult to correct.

SUMMARY OF THE INVENTION

The present invention is a helmet mounted display (HMD) that can project an image—from an image generator, such as a cathode ray tube (CRT) or a liquid crystal display (LCD)—to the eyes of an observer or both transmit such image and combine it with a direct view of the surrounding environment. The first such HMD is referred to as a non-see through or virtual reality display (VRD); the second, as a see through or heads up display (HUD).

The present invention consists of three basic elements: a spherical dielectric or holographically made collimator - combiner, a dielectric or holographically made fold mirror, and a contoured fiber optic faceplate. The amount of light which passes from the surrounding environment to the eyes of the observer is controlled by the coatings placed on the surfaces the collimator - combiner and the fold mirror as well as the angle, i.e., the tilt angle, between these two elements.

Techniques as discussed below, are incorporated to produce an optically corrected image. The invention is, thus, called an optically corrected helmet mounted display.

It is the primary object of this invention to reduce the aberrations and distortions produced by the tilt and the spherical collimator - combiner such as image field curvature, spherical aberration, astigmatism and keystone distortion with a contoured fiber optic faceplate by shaping the output side of the faceplate to match and cancel the errors. Keystone error is reduced by heating and distorting the square faceplate into a trapezoidal shape, roughly identical to the inverse of the keystone distortion. The astigmatism is reduced by bending the collimator - combiner inward in the horizontal direction to make the focal length in the horizontal direction approximately ½ diopter shorter than the focal length in the vertical direction. The complex field curvature and spherical aberration are corrected by contouring the output side of the faceplate to match them.

It is a further object of the present invention to simplify the display imaging optics by eliminating any relay lenses or other corrective refractive optics. The collimator - combiner and a fiber optic faceplate image a CRT or LCD display surface mounted above the eye with a simple dielectric or holographic fold mirror reflecting the image toward the collimator at the lowest practical tilt angle. The use of a planer fold mirror at this location is quite common in monochromatic systems and causes very little loss of light if angular bandwidths and tilt angles are properly designed and built. The common practice is to feed the fold mirror an image that has been corrected by a refractive lens, or a computer-generated hologram. The present invention makes these corrections in the contour of the fiber optic faceplate and thereby simplifies the imaging optics by reducing the number of elements to three.

It is also an object of this invention to make a 3-color corrected chromatic HMD without refractive optics. This is done by using reflective imaging optics only and, in order to transmit the image light through the fold mirror to the eye, it is necessary to make the reflectors highly sensitive to angle. The image light is folded and a few degrees of tilt is introduced effectively to move the three spectral peaks of the fold mirror across the three spectral peaks of the collimator - combiner, which not only results in a brighter image by conserving image light but also blocks more see through ambient light (in the case of an HUD). The tilt results in conserving most of the available image light, which is most important; but it blocks more of the ambient light, giving the appearance of a lightly shaded pair of sunglasses that change color slightly over the FOV. This arrangement is favorable to the creation of a simulator environment or a virtual reality. The needs of a pilot or vehicle operator, however, probably require a little more see through light and that can be accomplished by simply reducing spectral bandwidths and reflectivities until a proper balance is reached. The resolution of the system is limited only by the total number of pixels displayed (SBWP) of the display device and the fiber optic faceplate, not by a refractive relay system as is found in some similar HMD or HUD projectors.

It is another object of this invention to use the angle that the output contoured surface of the fiber optic faceplate makes with the fibers of such faceplate and the size of the fibers to control the direction of the exiting image light. This is not a pupil forming lens relay system, but the combination of elements produces an area at the exit pupil or eye position that contains most of the image light energy and so forms a kind of energy window. The effects of fiber size, surface finish, and face cut angles on the output end of the coherent bundle (the faceplate) will in combination with the collimator - combiner define the size and location of this energy window. The window may be redirected, in one plane, i.e., moved up or down, by orienting the contoured output surface of the fiber optic faceplate at an angle other than normal, i.e., ninety degrees, to the direction of the fibers, thereby forming a wedge-shaped fiber optic faceplate. The angular displacement of the image is roughly one half the angle between the tangent to the faceplate and the normal to the fibers, or one half of the wedge angle. The fiber size and surface finish determine the size of the energy window: smaller fibers and rougher finishes make larger windows, but too much roughness can reduce resolution. When stereo images are presented to the eyes, it is necessary to design the window so that most of the energy also gets to the eyes. The surface finish, fiber size, and cut angle together can be controlled in a sufficient range to achieve the desired energy window characteristics. Refractive optical systems often relay an image of a lens into the position of the viewer which sharply defines an energy window, usually called the system exit pupil. The energy window has fuzzier edges in the present invention which makes it less likely for the operator accidentally to slide out of the exit pupil or energy window as the operator is moved about in a vehicle or moves in another environment.

It is an additional object of this invention to use the fiber optic faceplate to blur the edges of the pixels of an LCD without losing resolution by selecting the proper numerical aperture (N. A.) of the fibers on the input side of the fiber optic faceplate and the corresponding correct distance of such pixels from the fiber optic faceplate. The blurring is necessary because the collimator - combiner has a high magnification, making every pixel of the display device clearly visible with a black outline that detracts from the realism of the view. The common technique currently used to correct this defect is to place a weak diffuser a short distance away from the pixels. The present invention, however, accomplishes the same task by placing the input side of the coherent bundle of fibers contained in the fiber optic faceplate a certain optimum distance from the display pixels. The minimum distance is fixed by the thickness of the LCD cover glass so that the optimum input N. A. is typically chosen to work best at that distance. In a practical design the required input N. A. may be smaller than the required output In this case a sandwich of two fiber optic faceplates with different sized fibers can be used. The finish on the output surface of the two fiber optic faceplates may be a fine grind texture with smaller high N. A. fibers which will scatter light at higher angles and extend the size of the energy window, while the input fibers (contained in the input fiber optic faceplate which will be called the first fiber optic faceplate) may be polished and made large to accept light over an angle just large enough to blur the edges of the pixels, without losing resolution or contrast. This method effectively eliminates the need for a diffuser plate which is now the common practice to effect blurring. The required input and output N. A.s may be close to the same value, especially when a low resolution LCD is being employed; in this special case a sandwich is not necessary and the fiber optic faceplate is a single element.

DESCRIPTION OF THE PREFERRED EMBODIMENT

Figure 1:
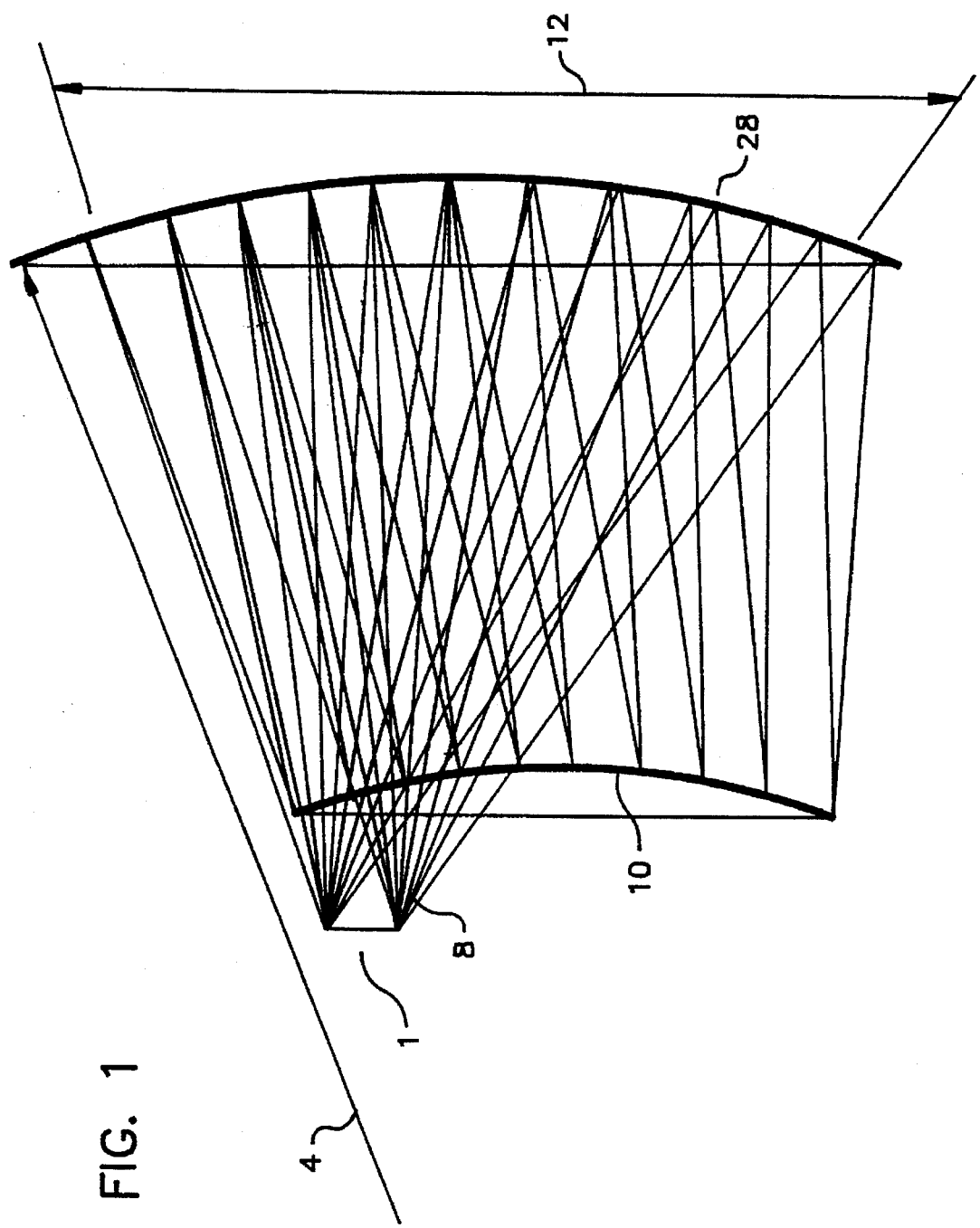
FIG. 1 illustrates the ray trace method used to find the correct contour for the image as it exits the fiber optic faceplate. The trace is made starting from the eye position and follows parallel bundles to the collimator - combiner which reflects and focuses all the bundles into an array of focused spots that, when connected, define the shape and position of the output surface of the fiber optic faceplate for that eye position. For clarity, the final folded path is not shown; folding simply puts the faceplate out of the see through path.
Figure 2:
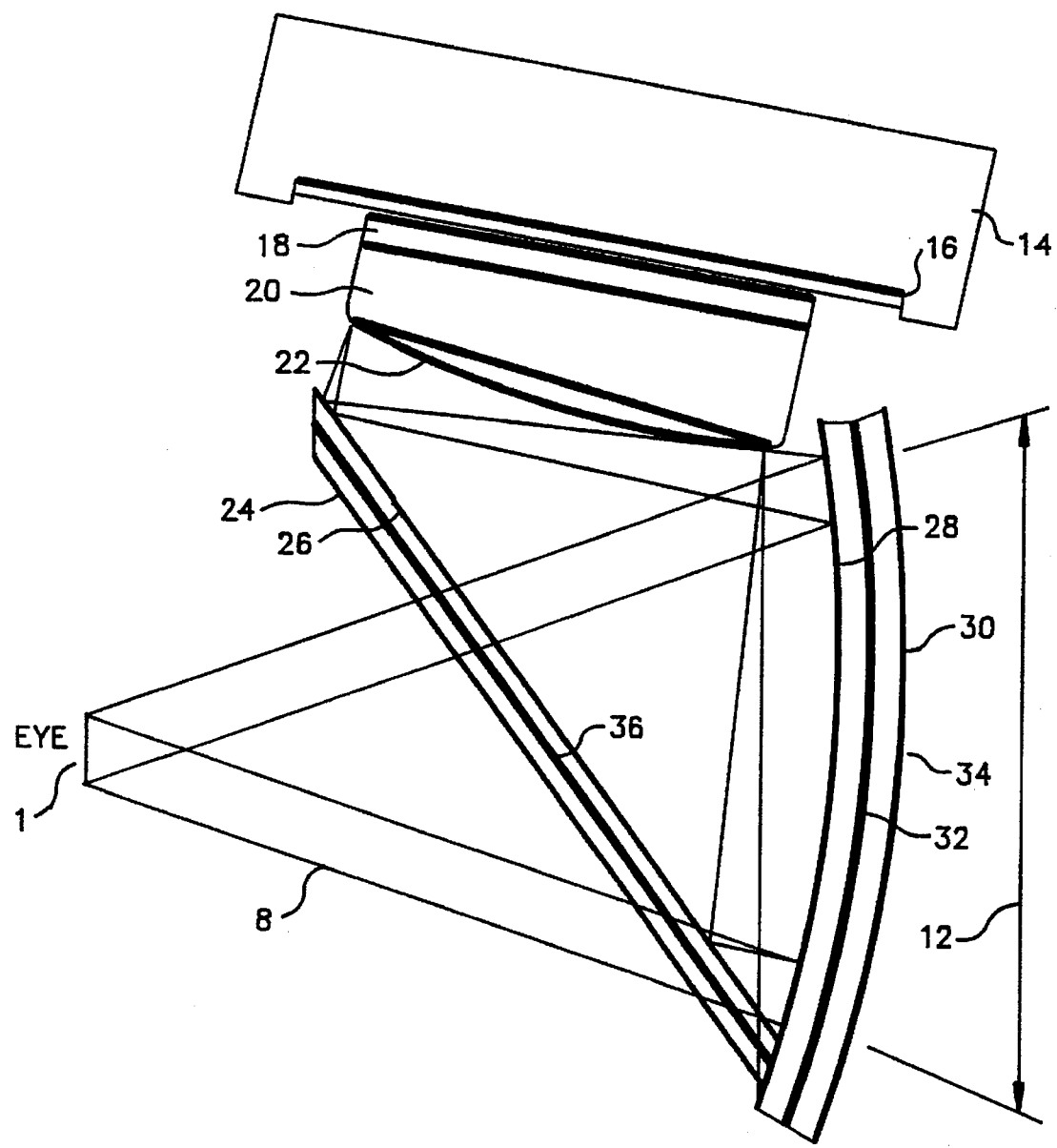
FIG. 2 illustrates the HMD system optical configuration, showing the relative positions of the LCD or other image generator, the fiber optic faceplate, the collimator - combiner, the fold mirror, and the viewer's eye position which is also the system exit pupil, or energy window. The output surface of the fiber optic faceplate has been shaped according to the ray trace of FIG. 1.

The optically corrected helmet mounted display consists of a fiber optic faceplate, a collimator - combiner 34, and a fold mirror 24.

1. Faceplate

The faceplate is composed of two fiber optic faceplates in contact with each other. The second fiber optic faceplate 20 is constructed from coherent fiber image conduit and has 6 to 15 micron diameter fibers with absorptive cladding to improve contrast. The output face 22 of the second fiber optic faceplate 20 is shaped on 260, then 600 and 1200 grit diamond wheels and, finally, finished by hand with finer and finer abrasives until image resolution or N. A. is optimum and the energy window is sized as desired. The first fiber optic faceplate 18 has larger fibers with a lower N. A. than those of the second fiber optic faceplate, a numerical aperture approximately equal to twice the pixel size of the image generator (LCD 16) divided by the distance between said first fiber optic faceplate 18 and said pixels, and may be placed against the LCD 16 in order to collect image light over a smaller angle than the angle at which it is being emitted from the LCD 16. This first fiber optic faceplate 18 is then cemented to the second fiber optic faceplate 20 containing smaller fibers and having a larger N. A. to provide a wider exit energy pupil at the eye position 1, which is also the energy window. This energy window may be moved up or down by orienting the contoured output surface 22 of the second fiber optic faceplate 20 at an angle other than ninety degrees with respect to the direction, of the fibers in the second fiber optic faceplate 20.

As an example, a liquid crystal television (LCTV) 14 having an LCD 16 with 160 micron pixels placed 1.2 mm from the faceplate works best for the input to the faceplate at an N. A. of 0.2; but a ray trace shows that an output N. A. of 0.4 for the output of the faceplate would be optimum for light to fill the designed exit energy pupil or energy window. The options for the designer are to make a sandwich of large and small fibers or to make the output surface of the larger fibers rougher so that light is scattered at larger angles, or a combination of the two. A simple fine grind finish can effectively double the N. A. of a fiber optic faceplate and may be all that is necessary to obtain the desired window size. This should be tried first; and if the fine grind causes a net loss of image resolution in order to gain a larger energy window, then a sandwich must be made using a faceplate of higher N. A. and a finer finish.

The size of the LCD or CRT screen 16, can be no longer on its shortest side than the focal length of the collimator - combiner 34, otherwise, it could not be folded out of the FOV 12. This is the reason for a fundamental limit to the FOV 12 in one direction, usually the vertical, because it can be no larger than the angle subtended by the fiber optic faceplate 20 from a position one focal length away. For standard commercially available eye glass type collimator - combiner 34 substrates, this is limited to between 40 and 45 mm and is also the maximum size of the output side of the output surface 22 of the second fiber optic faceplate 20.

2. Collimator-Combiner:

The collimator - combiner 34 is the primary image-forming element in this system and as such deserves to be discussed as a necessary part of the present invention. The shape of the collimator - combiner 34 and the position of the eye will define, by ray trace, the shape of the output surface 22 of the second fiber optic faceplate 20; and the fabrication of the collimator combiner 34 naturally affects the quality of the image. A preferred method of making collimator - combiners is to make all exposures on a single surface of a standard finished plano CR39 ophthalmic lens 28. CR39 is a hard resin with an index of refraction of 1.5 and comes in standard diameters of 75 mm with the concave surface having a radius typically of 80 mm, with some brands having 95 mm and 91 mm radii. In order to make gelatin adhere to most of the brands a hygroscopic sub coating is applied to both or either surface of a blank so that a good even coat of dichromated gelatin (DCG) 32 in thicknesses of 8 to 12 microns can be spun on. Subbing typically involves the use of sulfamic acid, chlorine, ammonium hydroxide, alcohol, and/or ammonium sulfide to prepare the surface for a thin layer of collodion or gelatin over which the final sensitive layer of DCG 32 can be deposited. These processes are detailed in Army SBIR contract report no. DAAA15-90-C-0021. To protect the processed gelatin a second CR39 ophthalmic blank 30 with a small amount of negative power is cemented to the convex surface in a process referred to as capping.

The reflectivity, angular bandwidth, and color of holographic elements are influenced by the angle at which they are exposed, the wavelength of the exposing radiation, the beam ratios, film thickness and absorption, exposure energy, processing, and the amount of shrinkage after processing and sealing. By experimenting with all of the above parameters, the best tricolor reflectors to date were made in a 10 micron coating of DCG 32 with about 40% absorption exposed for blue and green at 6 degrees tilt from the normal using the 457 and 514 nm lines of an argon laser. To get red reflection, the substrate is tipped away from a highly divergent 514 nm line to about 50 degrees from the normal. The exposure and processing are adjusted by trial and error until reflection peaks are centered at 620, 545, and 490 nm, which are the nominal target values found in color LCDs 16 used in liquid crystal televisions 14.

The real world can be seen through holographic collimator - combiners 34 with no distortion except that caused by tilting the substrate down several degrees with respect to the line of sight and the fold mirror 24. A small correct ion for the astigmatism induced by this tilt may be made by bending the completed assembly; but because of a limited and fairly narrow vertical FOV 12, this is optional and would result in a small distortion of the see through view. If the device is not a see through type, but is a closed virtual reality viewer, then the tilt may be removed and the view will be completely corrected for color, field curvature and all other aberrations and distortions. The 80 mm collimator - combiner radius 4 SILOR brand of lens is used in the prototype demonstrator because of its availability and good optical quality. A comfortable viewing distance for these collimators is 50 mm; and from the ray traces derived from a commercial ray trace program named BEAM 4 it is clear that field curvature is acceptable at this distance but better still at one focal length.

The collimator - combiner distorts the image surface 10 in several ways as shown in the vertical ray trace of FIG. 1. The image plane is curved at varying radii 4 from top to bottom, and it is tilted backward in the vertical plane. The fiber optic faceplate 20, thus, has to be shaped a little like an air foil from top to bottom to reduce the effects of the vertical tilt and is more or less spherical from side to side to match the spherical field. Ray traces are done with a commercial ray trace program to determine the exact shape of the image in three dimensions, and the output surface 22 of the fiber optic faceplate 20 is shaped to match it as closely as possible. The traces must be made in parallel bundles 8 from the eye position 1 to the collimator - combiner radius 4, and the collimator - combiner radius 4 defines the image shape as a locus of focused points 10 in all three dimensions.

3. Fold Mirror

The preferred fold mirror 24 is a good quality 3-line holographic mirror made using the same techniques (including a sensitive layer of DCG 36) used to make the collimator - combiner except that it is capped with an AR coated cover glass 26 to eliminate ghost images. A trace of the spectral transmission of this mirror is similar to that of the collimator - combiner 34 except that the angle it reflects at for any specific wavelength is closer to 51 degrees from the normal than to 6 degrees from the normal for the collimator - combiner 34, and the collimator combiner 34 tilt of 6 degrees with respect to the fold mirror 24 is enough to let the image light from the collimator - combiner 34 pass through the fold mirror 24, with little loss of intensity to the eye.

The configuration shown for the HMD is called a folded and tilted catadioptric design; it can have a maximum vertical FOV of as much as 50 degrees before the projected image meets the edge of the fiber optic faceplate 20. This occurs when the eye is at one focal length away from the collimator - combiner 34. With an eye relief of 50 mm it could have as much as a 45 degree FOV vertically and 80 degrees horizontally; the horizontal FOV is limited by the nose of the observer more than the optics.

I claim:

1. A method for controlling the size of the energy window of a catadioptric HMD where the refractive relay lenses have been replaced with a fiber optic faceplate, comprising:

placing a first fiber optic faceplate to receive the image from the image generator;

locating a second fiber optic faceplate, which has smaller fibers with a higher numerical aperture than those of said first fiber optic faceplate, to receive the image from said first fiber optic faceplate; and grinding the output surface of said second fiber optic faceplate finer to increase the angle at which it will scatter light.

2. A method for providing a head-mounted display device comprising:

providing an image generator for generating image light;

placing a first plate having fibers defining an input surface and an output surface with said input surface adjacent said image generator to receive said image light and provide said image light to said output surface;

positioning a second plate having an input surface and an output surface with the input surface of said second plate adjacent the output surface of the said first plate, wherein said second plate comprises fibers which are smaller in diameter than the fibers of the first plate.

3. A method as claimed in claim 2 further comprising:

positioning a fold mirror for receiving image light output at the output surface of said second plate and reflecting said image light away from the eye of the user;

positioning a reflector to receive said image light transmitted in said first direction and reflect said image light toward the eye of the user.

4. A method for providing a head-mounted display device comprising:

providing an image generator for generating image light;

placing a first plate having fibers defining an input surface and an output surface with said input surface adjacent said image generator to receive said image light and provide said image light to said output surface;

positioning a second plate having an input surface and an output surface with the input surface of said second plate adjacent the output surface of the said first plate, wherein said second plate comprises fibers which are smaller in diameter than the fibers of the first plate;

treating said output surface of said second plate to provide surface roughness sufficiently great to achieve a desired energy window, but sufficiently smooth to avoid substantially degrading image resolution.

5. Head-mounted display apparatus comprising:

an image generator which outputs image light;

a first means for receiving image light from said image generator, said first means comprising fibers having a first diameter;

a second means for receiving image light output by said first means comprising a plurality of fibers having a diameter greater than said first diameter;

a fold mirror for receiving light output by said second means and reflecting said light in a first direction away from the eye of the user;

a reflector for receiving said image light transmitted in said first direction and redirecting said image light toward the eye of the user.

6. Apparatus as claimed in claim 5 wherein said reflector is a curved reflector defining a focus.

7. Apparatus as claimed in claim 5 wherein said fibers of said second means having a diameter between about six microns and about fifteen microns.

8. Apparatus as claimed in claim 5 wherein said first means is substantially in contact with said image generator.

9. Apparatus as claimed in claim 5 wherein said second means is substantially in contact with said first means.

10. Head-mounted display apparatus comprising:

an image generator;

a first plate positioned to receive image light from said image generator and having fiber optic means;

means for controlling the size of the energy window comprising a plurality of fibers adjacent said first plate wherein the diameter of said plurality of fibers is greater than the diameter of the fiber optic means in said first plate.

* * * * *